United States Patent [19]
Yoneyama

[11] Patent Number: 5,890,863
[45] Date of Patent: Apr. 6, 1999

[54] MICROMANIPULATOR FINE CONTROL APPARATUS

[75] Inventor: Shinji Yoneyama, Tokyo, Japan

[73] Assignee: Narishige Co., Ltd., Tokyo, Japan

[21] Appl. No.: 882,500

[22] Filed: Jun. 25, 1997

[30] Foreign Application Priority Data

Jun. 25, 1996 [JP] Japan ................................ 8-164193

[51] Int. Cl.$^6$ ................................................ B25J 3/04
[52] U.S. Cl. .................... 414/4; 414/749; 74/479
[58] Field of Search .................. 414/4, 5, 6, 2, 414/749; 74/471 XY

[56] References Cited

U.S. PATENT DOCUMENTS

| | | |
|---|---|---|
| 3,204,584 | 9/1965 | Mladjan . |
| 3,779,400 | 12/1973 | Brockman et al. ............... 318/687 |
| 4,679,976 | 7/1987 | Nashige et al. .................. 414/4 |
| 4,946,329 | 8/1990 | Krueger ........................ 414/4 |
| 5,109,724 | 5/1992 | Delarue et al. ................. 74/479 |
| 5,152,488 | 10/1992 | Richardson .................... 74/470 |

FOREIGN PATENT DOCUMENTS

2186706  8/1987  United Kingdom .

Primary Examiner—David A. Bucci
Assistant Examiner—Gregory A Morse
Attorney, Agent, or Firm—Pillsbury Madison & Sutro LLP

[57] ABSTRACT

A micromanipulator apparatus includes an operation handle joined to a slide plate for moving the slide plate forward and backward and leftward and rightward. A first lever joined to the slide plate is rotated in forward and backward direction around a supporting point pin by means of a first guide pin engaged in a first slot in the slide plate, and a second lever is rotated in leftward and rightward direction around a second supporting pin by means of a second guide pin engaged in a second slot in the slide plate. Separate hydraulic devices are operated in response to activation by working rods associated with the respective levers. Movement of the slide plate and operation of the hydraulic devices provides precise movement to a workpiece supported by the apparatus.

5 Claims, 9 Drawing Sheets

(PRIOR ART)

MICROMANIPULATOR FINE CONTROL APPARATUS

BACKGROUND OF THE INVENTION

1. Field of the Invention

The present invention relates to a micromanipulator for a fine control apparatus such as glass electrode or the like which is positioned under a microscope by remote control using hydraulic pressure.

2. Prior Art

In the field of basic medical science or biotechnology, a micromanipulator is used when retaining, suctioning, pouring, dividing, or performing other procedures on organs or the cellular structure of creatures, eggs, or the like. The micromanipulator is finely controlled for exact positioning under a microscope.

However, when an operator directly touches an operating handle of the micromanipulator in actual operation, any trembling of his fingers is transmitted to the micromanipulator in magnified degree. The operator is required to use utmost care and skillfulness in operation. Therefore, known remotely controllable fine control micromanipulators use hydraulic pressure.

Figure 10:
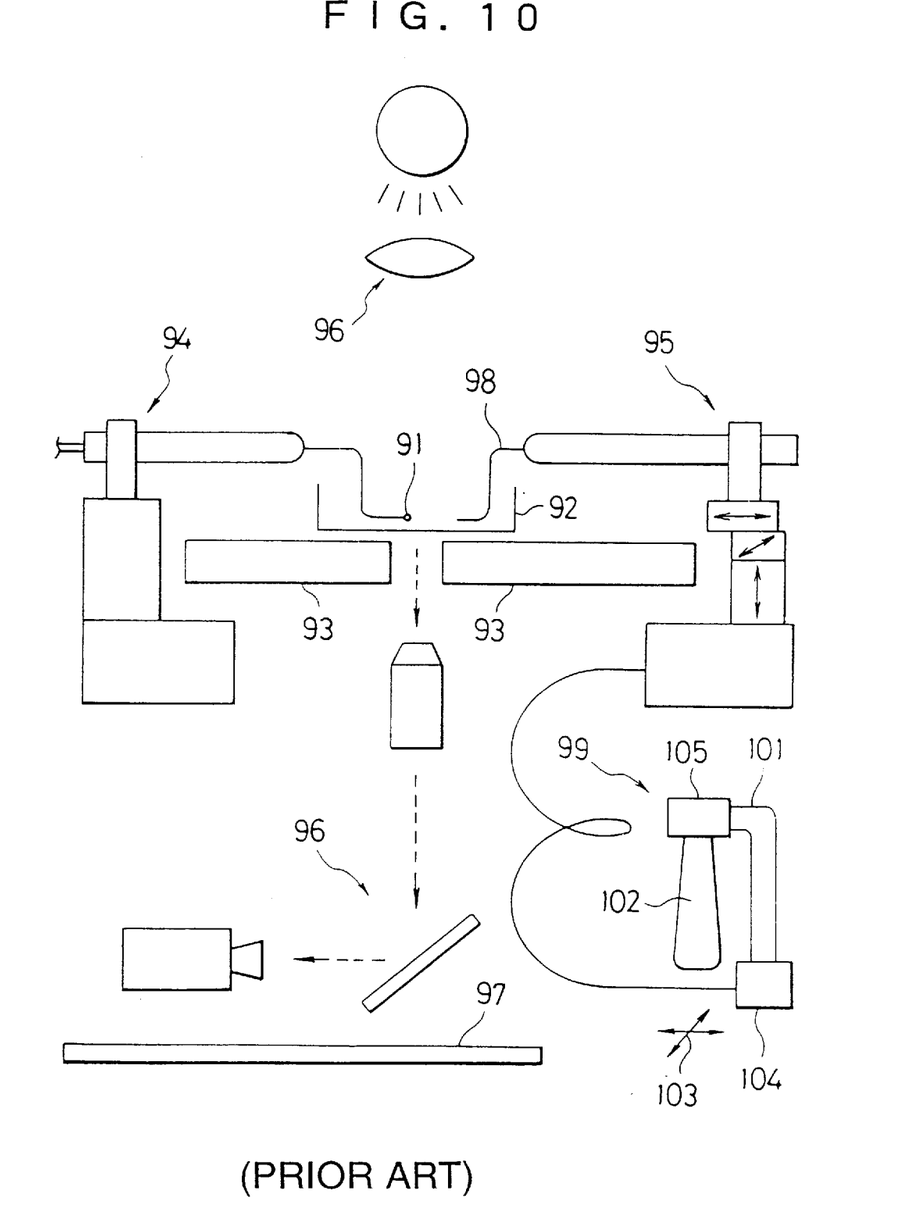
FIG. 10 illustrates the overall construction of a conventional egg cell treating apparatus.

FIG. 10 illustrates the structure of a conventional cell handling apparatus.

In FIG. 10, reference numeral 91 indicates egg cells. Reference numeral 93 indicates a platform on which a petri dish 92 containing a testing liquid for the egg cells 91 is placed. The egg cells 91 are immersed in the testing liquid in the petri dish 92, Reference numeral 94 indicates a fixed supporting part for the egg cells 91. The fixed supporting part 94 includes a micromanipulator 95 positioning the egg cells. The fixed supporting part 94 also includes a lighting system 96 for observing an illuminated image of the egg cells 91. The egg cell positioning apparatus is placed on a vibration proof mat 97.

The micromanipulator 95 is provided with a microtool 98, such as a glass electrode or the like, specifically designed for egg cell positioning. The foremost end of the micromanipulator 95 is provided with a three-dimensional displacement mechanism. An operator activates the three-dimensional displacement mechanism by means of hydraulic pressure generated by a joystick 99.

The joystick 99 is formed such that an operating handle 102 is suspended from the foremost end of a supporting frame 101 and the joystick 99 rocks in two horizontal directions 103 crossing at right angle as indicated by the arrows. The rocking motion of the joystick 99 is translated to the three-dimensional displacement mechanism through a transmission part 104 by means of hydraulic pressure.

The operating handle 102 is provided with a conversion part 105 to convert the rocking motion in two horizontal directions 103 to mechanical displacement in a horizontal plane. The conversion part 105 is provided at a position where said conversion part 105 is connected to the supporting frame 101.

Previously it was customary to provide the operation handle 105 projecting upwardly from the conversion part 105, but nowadays a suspended type joystick has been preferably used in most cases.

In a conventional apparatus, when the cells are to be moved in a vertical direction by the three-dimensional displacement mechanism, a mechanism of fine control in vertical direction is also provided for the three-dimensional displacement mechanism.

In known three-dimensional displacement mechanisms operated by a fine control joystick using hydraulic pressure, the operator displaces the operating handle of the joystick in a desired direction to displace the foremost tip end of a microtool disposed in the micromanipulator so as to observe the cells through a microscope. The operator must have a sense of how to displace the microtool of the micromanipulator in horizontal plane while the handle of the joystick is inclined for proper vertical position. This has been a confusing and sensitive problem in practical operation.

SUMMARY OF THE INVENTION

The present invention has been made with the foregoing background in mind. The present invention does not use a joystick. Instead, it provides a fine control operation apparatus which moves an operating handle in a horizontal plane while resolving the aforementioned problems.

The present invention includes the following features.

A base plate is provided with two parallel grooves extending in left to right direction.

A slide frame is provided which includes two slide bars which are slidably fitted within the two grooves of the base plate, respectively, the frame having two guide parts arranged in parallel and in parallel connecting the two slide bars.

A slide plate is provided with an upright operation handle on its upper surface, the slide plate being slidably fitted between the two guide parts of the slide frame and having a first slot extending in a left to right direction at the rear or front side of the frame and having a second slot extending in a front to rear direction at the left or right side of the frame.

A first lever has a base part rotatively supported by a first supporting point pin vertically provided near the end of first recessed portion of almost square shape formed in a left or right direction on said base plate, the first levers having a notch at its central part and a vertically oriented first guide pin at its foremost end which engages the first slot of the slide plate.

A first movable member is fitted in longitudinal direction at the base part of the first lever near the first supporting point pin of the first lever and is provided with a first working rod extending upwardly at its rear end.

A first fine control adjustment screw member is located between the rear end of said first lever and the rear end of said first movable member to adjust and fix the position of said first movable member and also to adjust the distance between the first supporting point pin and the first working rod.

A first slider contacts the first working rod of the first movable member at its base part and is slidably fitted in front to rear direction in a first engagement part and extends in front to rear direction on said base plate.

A fine control hydraulic pressure means operates in front to rear directions and extends between one end of said first slider and said base plate and includes a first hydraulic cylinder connected at one end to the front to rear direction fine control hydraulic cylinder of the micromanipulator through a first hose and a first piston movably fitted in said first hydraulic cylinder at its other end to increase or decrease the fluid amounts in the first hydraulic cylinder by means of movement of the first slider.

A second lever has a base part relatively supported by the second supporting point pin vertically provided near the rear end of a second recessed portion formed in said base plate, having a notch crossable to the notch of the first lever at the center and having a vertically second guide pin at foremost end which engages the second slot of the slide plate.

A second fine control adjustment screw member is movably fitted in longitudinal direction at the base part of the second lever near the second supporting point pin and extending to a second movable member provided with a second working rod at its rear end, the second adjustment screw being located between the rear end of the second lever and the rear end of the second movable member to adjust and fix the position of the second movable member and also to adjust the distance between the second supporting point pin and the second working rod.

A second slider contacts the second working rod of said second movable member at its base and is slidably fitted in left to right direction in a second engagement part extended in left to right direction of said base plate.

A fine control hydraulic pressure means operates in left to right directions and extends between one end of said second slider and said base plate and includes a second hydraulic cylinder connected at one end to a left to right direction fine control hydraulic cylinder of the micromanipulator through a second hose and at the other end to a second piston movably fitted in said second hydraulic cylinder to increase or decrease the fluid amounts in the second hydraulic cylinder by means of movement of the second slider.

When said slide plate is moved in front to rear and left to right directions by handling an operation lever on said slide plate, said first lever is rotated in front to rear direction around the first supporting point pin by means of the first guide pin engaged in said slide plate. The second lever is rotated in left to right direction around the second supporting point pin by means of the second guide pin engaged in said slide plate. The first working rod moves the first slider to increase or decrease the liquid amounts in the first hydraulic cylinder and the second working pin moves the second slider to increase or decrease the liquid amounts in the second hydraulic cylinder. The micromanipulator is finely moved in front to rear directions and in left to right directions corresponding to the movement of the slide plate.

DETAILED EXPLANATION OF THE PREFERRED EMBODIMENTS OF THE INVENTION

Now an example of micromanipulator fine control apparatus according to the present invention is explained with reference to the accompanying drawings.

Figure 1:
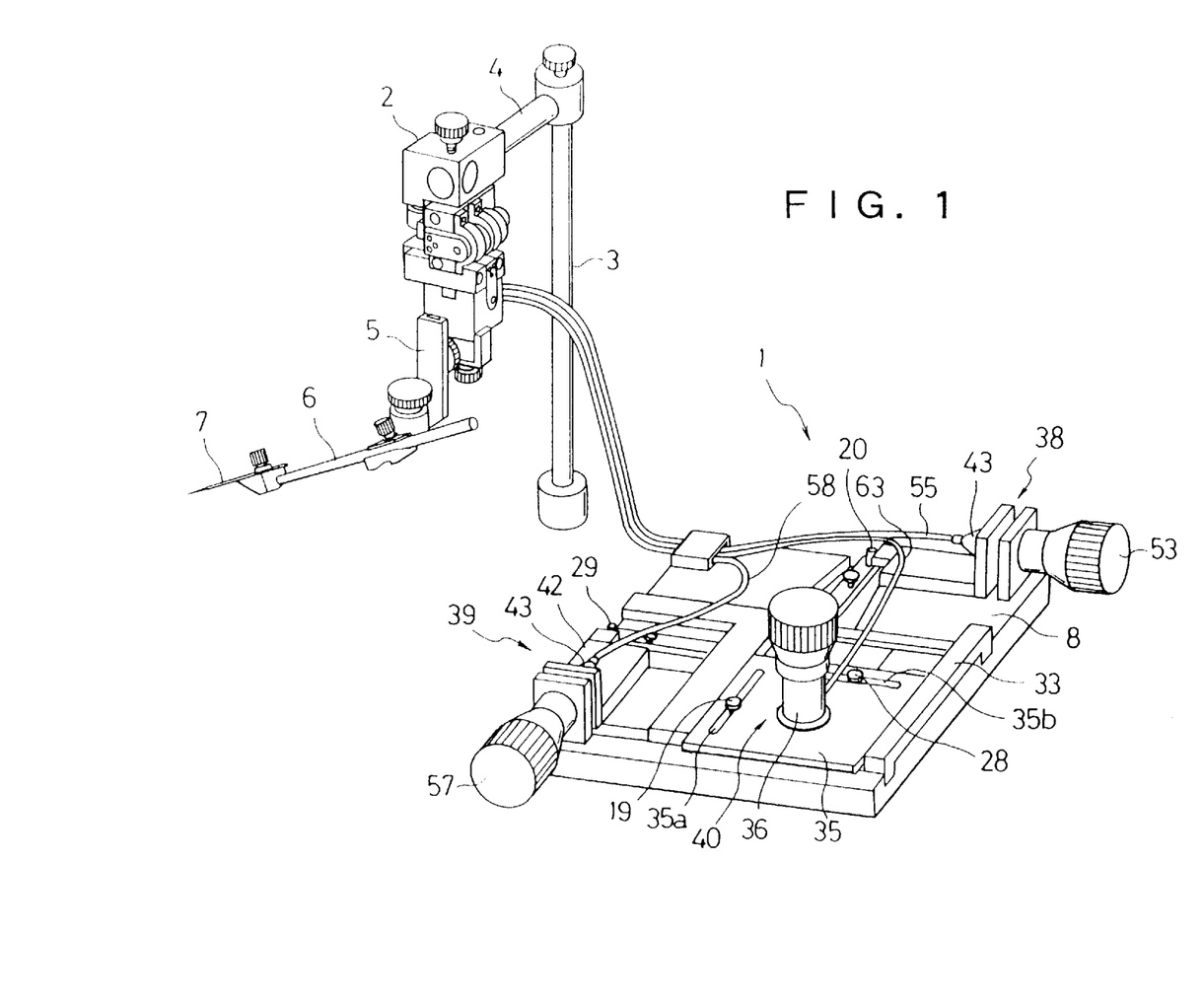
FIG. 1 is a perspective view illustrating a fine control apparatus mounted on a micromanipulator according to the present invention.

FIG. 1 is a perspective view indicating a micromanipulator fine control apparatus according to the present invention mounted on a three-dimensional liquid pressure micromanipulator according to the present invention. The micromanipulator is connected to a three-dimensional liquid pressure micromanipulator 2 (hereinafter referred to only as micromanipulator). The micromanipulator 2 is fixedly held to a bar 4 held by a supporting pole 3. The micromanipulator 2 supports a glass electrode 7 by means of a tightening element 5 and a holder 6.

Figure 2:
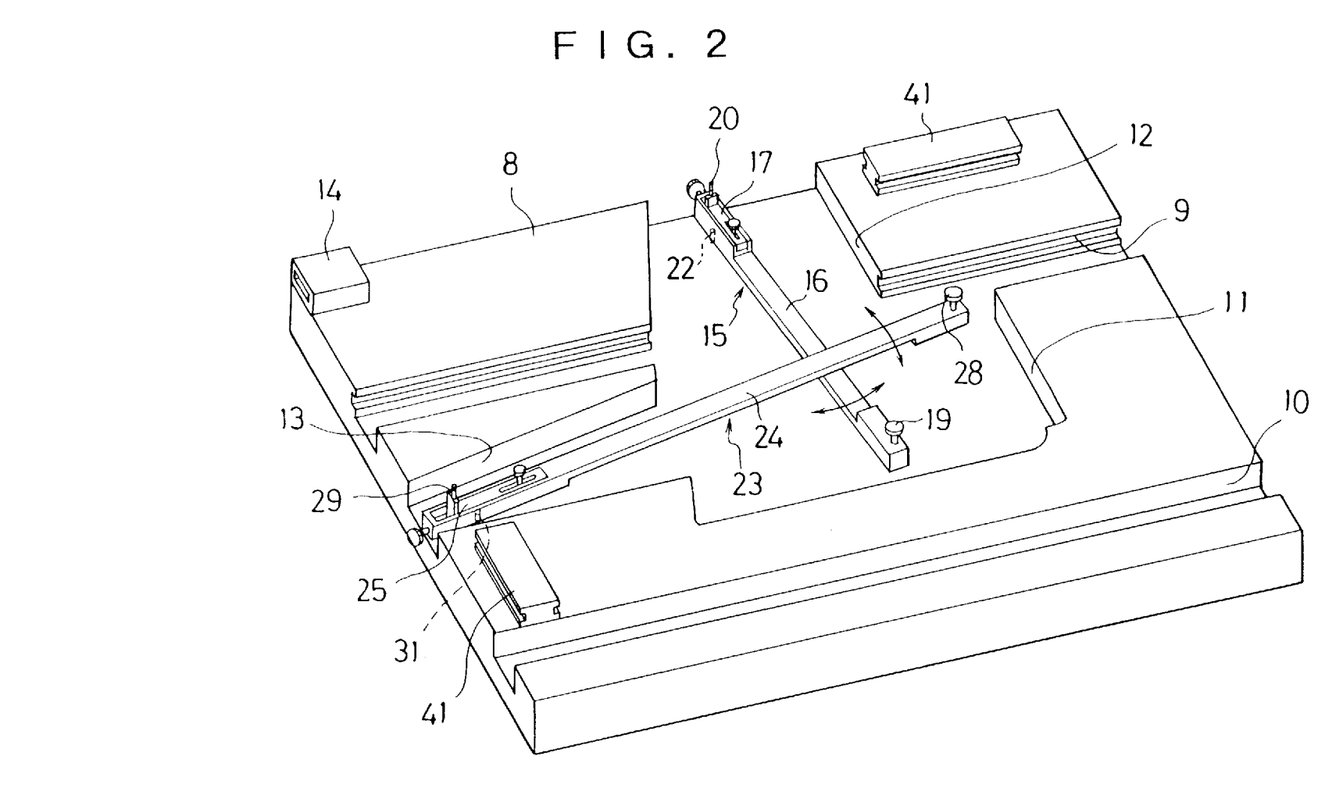
FIG. 2 is a perspective view of a base plate of the micromanipulator according to the present invention.

FIG. 2 is a perspective view of a base plate of the micromanipulator fine control apparatus according to the present invention. As shown by the figure, the micromanipulator fine control apparatus 1 (FIG. 1) has a base plate 8. The base plate 8 is provided with grooves 9 and 10 having a predetermined distance and extending in left to right direction in parallel. Also, a recessed part 11 of almost square shape is provided engraved nearly at central part of the base plate which is surrounded by the grooves 9 and 10. A recessed part 12 for receiving a lever is also provided in the base plate extending in a rearward direction from the recessed part 11. (In FIG. 2 the recessed part 12 is shown at upper part of the recessed part 11.) Another recessed part 13 of triangular shape for receiving another lever is provided at left side of the base plate part in FIG. 2. The recessed part 11, the groove 9, the recessed part 12 for a lever and another recessed part 13 for another lever are in communication. Reference numeral 14 indicates a hose holder to support hoses.

Figure 3:
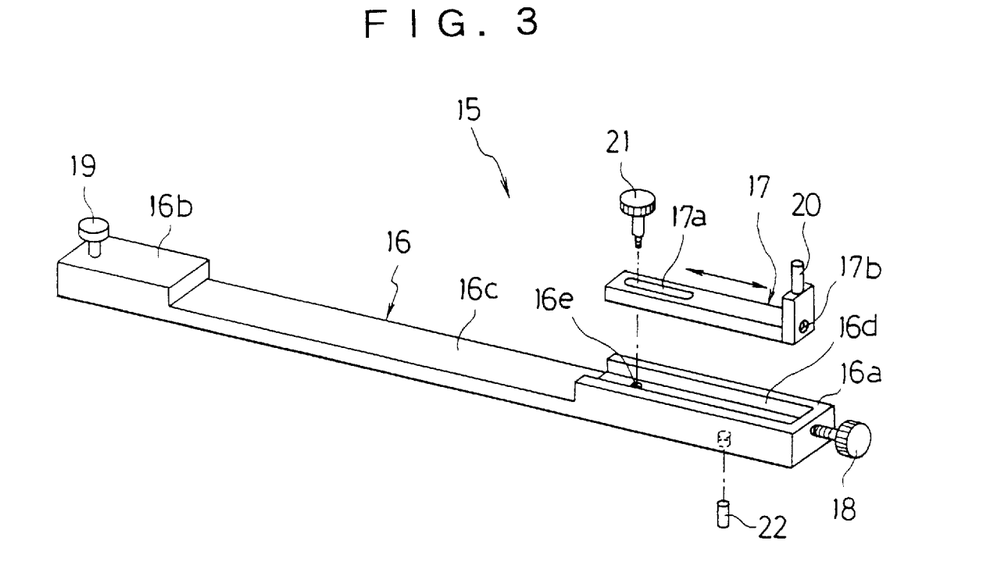
FIG. 3 is an exploded perspective view of a left to right direction fine control lever.

Also, a lever 15 for left and right fine control is relatively supported in the recessed part 12 and recessed part 11 by a pin 22 which is a supporting point for the lever. The left and right fine control lever 15 is, as shown in FIG. 3, comprised of a main lever 16 portion and a fine control adjuster 17. The main lever 16 portion has a base end 16a at the pin 22 end, tip end 16b and a connecting portion 16c which connects the base end 16a and a lower part of the tip end 16b. On the upper part of the base part 16a of the main lever 16 there is provided a groove 16d extending in longitudinal direction and at its inner end opened. A screw hole 16e is provided at the top portion of the groove led. The groove 16d is also provided with a screw hole at its closed rear face. A fine control adjustment screw 18 is fitted in the latter screw screwed hole. Additionally, on the upper surface of-the top portion of the top end 16b of the main lever 16a vertically extending guide pin 19 is provided.

A fine control adjuster 17 is fitted slidably in the groove 16d of the main lever 16. The fine control ratio adjuster 17 has a slot 17a at its forward end and a screw hole 17b to receive the fine control adjustment screw 18 at its rear end. A vertically extending working rod 20 is provided at its rear upper end portion.

An axial part of a screw 21 is inserted in the slot 17a of the fine control adjuster 17, the top end of the screw bolt 21 being fitted in a screw hole 16e. The fine control adjuster 17 is slidably positioned within the main lever 16 by means of the set screw 21 in the slot 17a. When the set screw 21 is tightened the fine control adjuster 17 is held against the lever 16 by means of bolt head of the screw 21.

The pin 22 embedded in the base plate 8 is inserted in a hole provided in the lower surface of the base end 16a of the main lever 16, the main lever 16 being relatively supported by the pin 22.

Accordingly, to operate the fine control adjuster 17 the set screw 21 is loosened and the fine control adjustment screw 18 is rotated to move the fine control adjuster 17 along slot 17a, thereby adjusting the fine control in the left and right direction. Next, the set screw 21 is tightened, and the fine control adjuster 17 is set with respect to the main lever 16.

The amount of fine control is increased as the distance between the pin 22 and the working rod 20 is widened, whereas, the fine control amount is decreased as the distance between the pin 22 and the working rod 20 is decreased.

As shown in FIG. 2, a front and rear direction fine control lever 23 is rotatively supported by a pin 31 in the recessed part 13 of triangular shape and the recessed part 11 of almost square shape provided in the base plate 8. The front and rear direction fine control lever 23 (shown in detail in FIG. 4) comprises a main lever 24 (a first lever) and a first fine control adjuster 25. The main lever 24 comprises a base part 24a, an end part 24b and a connecting part 24c. A groove 24d is provided in longitudinal direction on the upper surface of the base part 24a of the main lever 24. The groove 24d is provided with a screw hole 24e on its bottom. The groove 24d is also provided at a rear surface thereof with a screw hole which is fitted with a fine control adjustment screw 26. A guide pin 28 is vertically provided at the upper surface of the end part 24b.

Figure 4:
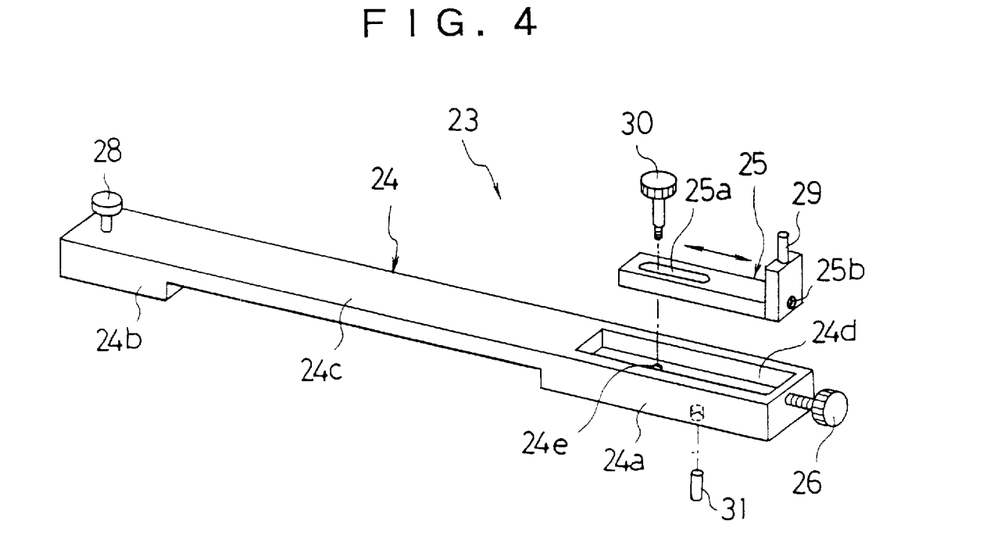
FIG. 4 is an exploded perspective view of a front to rear direction fine control lever.

The first fine control adjuster 25 is fitted slidably in the longitudinal direction within the groove 24d of the main lever 24. A slot 25a is provided at an end of the fine control adjuster 25. The first fine control adjuster 25 has a screw hole 25b at tits end to receive a fine control ratio adjustment screw 26, and a vertically extending working rod 29 is provided at the rear end upper portion of adjuster 25.

An axial part of a set screw 30 is inserted within slot 25a of the first fine control adjuster 25, the end of screw 30 being received within screwed hole 24e. The fine control adjuster 25 is slidable with respect to the set screw 30 and the main lever 24 within the slot 25a. When screw 30 is tightened the fine control adjuster 25 is fixed with respect to the main lever 24 by means of the head of the screw 30.

The pin 31 embedded in the base plate 8 at the end of recessed part 13 is inserted in a hole provided in the lower surface of base part 24a of the main lever 24. The main lever 24 is rotatively supported by said pin 31.

Accordingly, to operate the fine control adjuster 25 the fine control ratio adjustment screw 26 is rotated to move the fine control adjuster 25 along, slot 25a whereby fine control in forward and backward directions is adjusted. Then the set screw 30 is tightened and the fine control adjuster 25 is set with respect to the main lever 24.

The amount of fine control is increased as the distance between the pin 31 and the working rod 29 is widened, whereas fine control is decreased as the distance between the pin 31 and the working rod 29 is decreased. The main lever 16 and the main lever 24 cross one another within the recessed part 11 of base plate 8 at their respecting connecting part 16c and connecting part 24c. Each lever is not disturbed the rotative motions of t he other. (Refer to FIG. 2).

Figure 5:
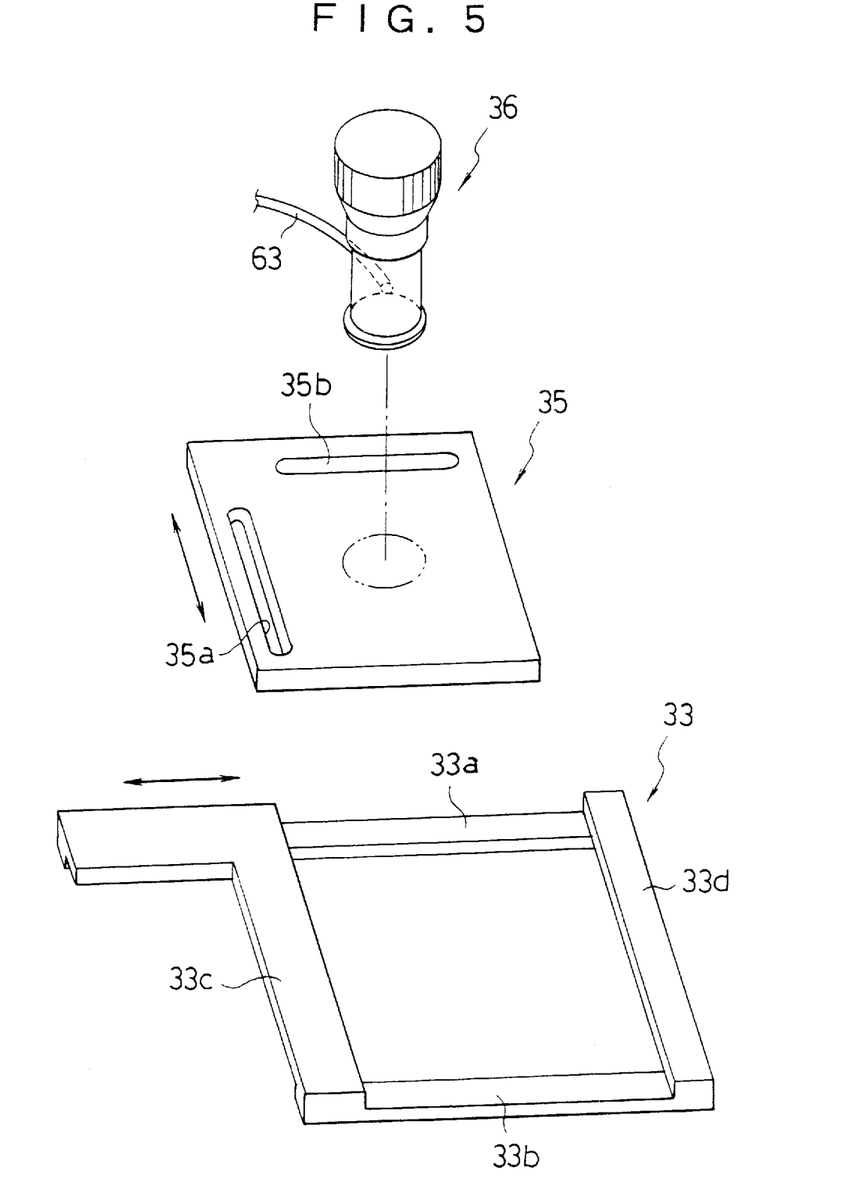
FIG. 5 is an exploded perspective view illustrating a slider plate of a micromanipulator according to the present invention.

FIG. 5 is an exploded perspective view of the slide plate part of the micromanipulator fine control apparatus as indicated in FIG. 5, a slide frame 33 is provided with sliding parts 33a, 33b which are respectively slidably fitted to the groove 9 and the groove 10 of said base plate 8. The slide frame 33 has a predetermined distance in left to right directions connecting said slider part 33a and 33b. Said slide frame 33 has guide parts 33c and 33d extending in front to rear directions. Said slide frame 33 is movably mounted in left and right directions on the base plate 8.

There is provided a slide plate 35 slidably mounted in the front to rear directions between the guide parts 33c and 33d of the slide frame 33. A slot 35a (second slot) extending in front to rear is provided near the left side of the side plate 35. There is also provided a slot 35b (first slot) extending in left to right direction near the rear side of the slide plate 35.

An axial part of the guide pin 19 of said left and right direction fine control lever 15 is inserted in the slot 35a. The axial part is retained by means of the head of the guide pin 19. An axial part of the guide pin 28 of said front and rear direction fine control lever 23 is inserted in the slot 35b. The axial part is retained by means of the head of the guide pin 28.

A vertically oriented operation bar 36 is provided substantially in the center of the slide plate 35. The operation bar concurrently acts as an upper and lower fine control operation mechanism.

Next, the left and right direction fine control mechanism 38 which contacts the working bar 20 of the left and right direction fine control lever 15 will be explained.

Figure 6:
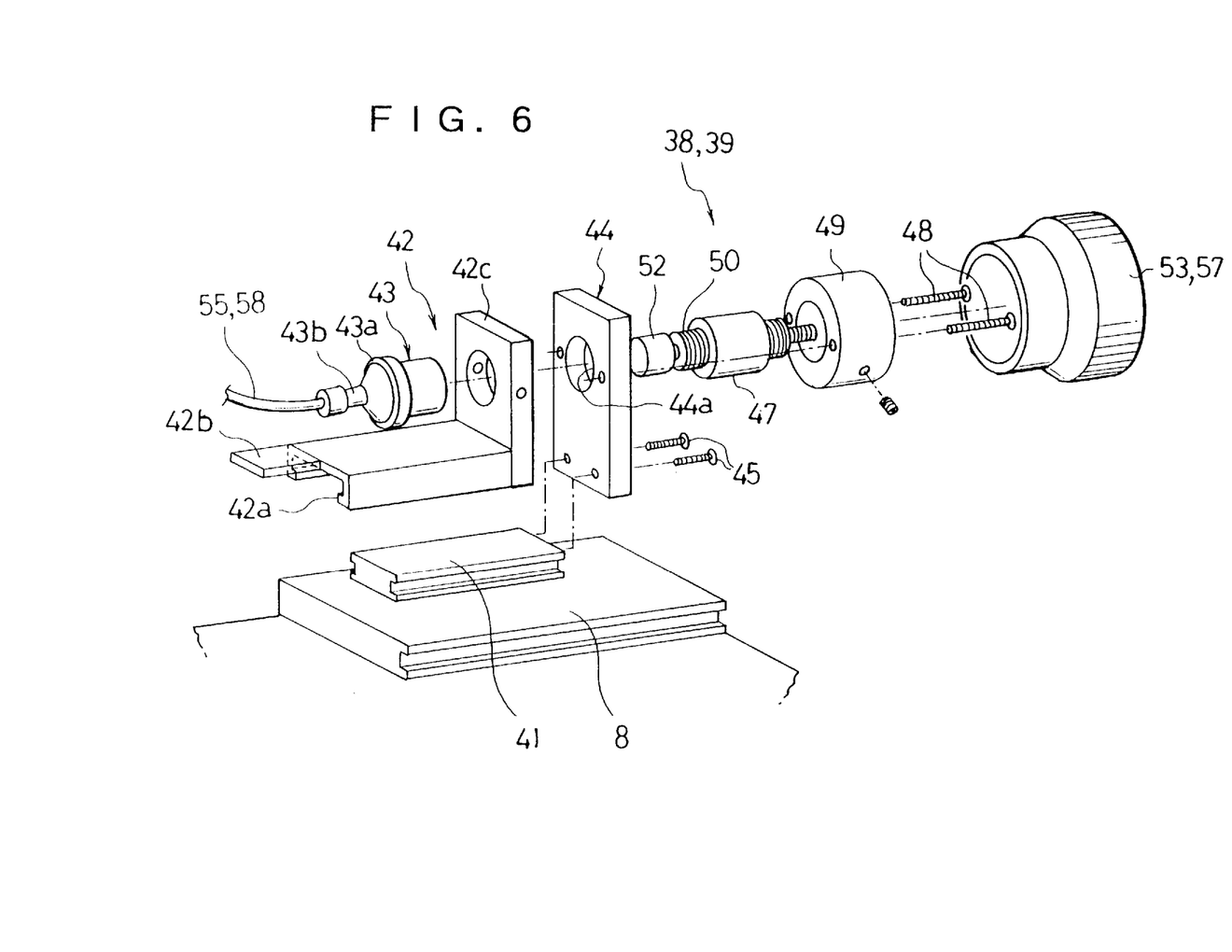
FIG. 6 is an exploded perspective view of a left to right direction fine control operating mechanism and front to rear direction fine control operating mechanism.

FIG. 6 is an exploded perspective view of the left and right and front and rear direction fine control mechanisms. For convenience of illustration, both mechanisms are shown together in FIG. 6. It will be understood, however, that they actually are separate mechanisms, as shown in FIG. 1. As shown by FIG. 6, an inside slider 41 of flat plate shape extending in the left to right direction is fixedly mounted to the base plate 8 at the right side of recessed part 12 of the base plate (FIG. 2). An outside slider 42 has a recessed groove 42a which is provided in a downward direction at its lower face and a upwardly protruding part 42c contacting the working rod 20 of the left and right directions fine control lever 15 at the rear end of lever 15 and a supporting plate 42c extending upward at the right side of slider 42.

Supporting plate 42c has a circular opening which receives a hydraulic cylinder 43. The circumferential edge of said opening is contacted with a flange part 43a of the hydraulic cylinder 43. The hydraulic cylinder 43 has one end opened and has flange 43a and a hose fitting part 43b at its closed end. A piston 52 is slidably fitted in the hydraulic cylinder 43. There is formed a hydraulic chamber between the hydraulic cylinder 43 and the piston 52.

The outside slider 42 and the hydraulic cylinder 43 are attached and move in left and right directions together.

The lower part of a handle supporting plate 44 extends uprightly and is fixedly set at the right side end of the inside slider 41 by means of bolts 45, 45. A hole 44a is set at almost the same level as the level of the opening of the cylinder supporting plate 42c of the outside slider 42 at the upper part of the handle supporting plate 44. The hole 44a receives the rear end of a bearing 47. The bearing 47 is further mounted in the central hole of a bearing set ring 49 fixed to the handle supporting plate 44 by means of bolts 48, 48. A female screw thread is provided within a hole in the bearing 47. The female screw thread is fitted with male screw thread of a fine control screw shaft 50. The fine control screw shaft 50 is fixed to cylindrical piston 52 at the forward end of said fine control screw shaft 50. Said piston 52 is freely inserted into the hole 44a of the handle supporting plate 44 to permit it to move forward and backwards in the hydraulic cylinder 43.

The base end of the fine control screw shaft 50 is fixed to a left and right fine control handle 53. The left and right fine control handle 53 is relatively fitted to the outer circumference of the bearing metal set ring 49. The outer circumference of the left and right fine control handle 53 is knurled.

When the left and the right fine control handle 53 is rotated the fine control screw shaft 50 is rotated. The fine control screw shaft 50 moves to the left or the right direction, because the male screw thread of the fine control screw shaft mates with the female screw thread of the bearing metal 47. Accordingly, the piston 52 moves in the left or right direction to go forward or backward within the hydraulic cylinder 43.

Figure 8:
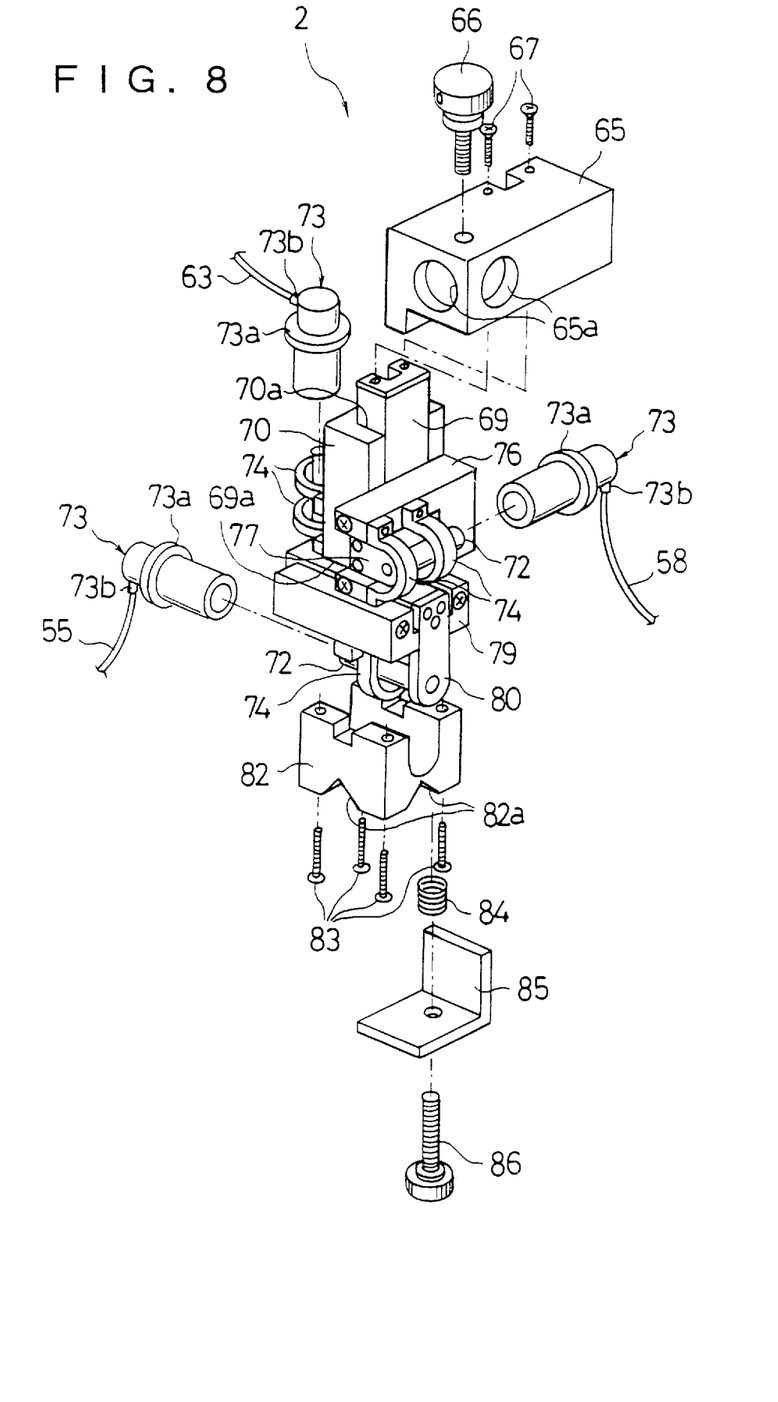
FIG. 8 is an exploded perspective view of a micromanipulator.

One end of a connecting hose 55 is joined to the hose fitting part 43*b* to communicate with an oil chamber of the hydraulic cylinder 43 through a narrow hole. The other end of the hose 55 is connected to a X coordinate hydraulic cylinder 73 of the left and right direction fine control of the micromanipulator 2 (FIG. 8).

As also represented in FIG. 6, the forward and backward fine control operation mechanism 39 which contacts the working rod 29 of said forward and backward fine control lever 24 is also constructed like the above-described left and right direction fine control operation mechanism 38. For this reason, the separate mechanisms shown in FIG. 1 have been combined in FIG. 6 for convenience of illustration. When a forward and backward fine control handle 57 is rotated, the fine control screw shaft 50 is moved in a forward or backward direction and accordingly, the piston 52 is also moved in a forward and backward direction.

One end of the communication hose 58 is connected to a hose fitting part 43*b* of the hydraulic cylinder 43. The other end of the communication hose 58 is connected to a Y coordinate hydraulic cylinder 73 of the forward and backward direction fine control of the micromanipulator 2 (FIG. 8).

Figure 7:
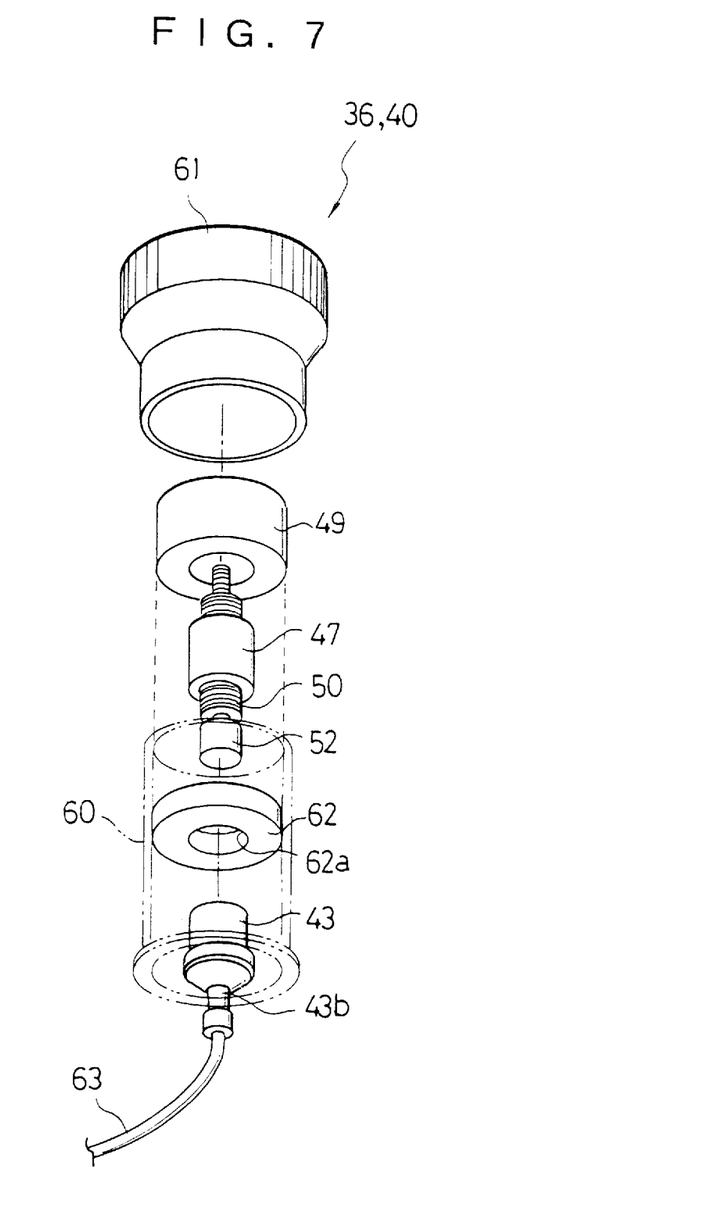
FIG. 7 is an exploded perspective view of upper and lower fine control operating mechanism.

FIG. 7 is an exploded perspective view of a vertical fine control operating mechanism 40. As shown in FIG. 7, a cylindrical casing 60 is vertically oriented with respect to the central portion of a slide plate 35 shown in FIG. 5. A bearing set ring 49 is fitted to an upper circumference of the cylindrical casing 60. A vertical fine control handle 61, of which the outside circumference is knurled, is rotatably fitted at upper end of the cylindrical casing 60. A hydraulic cylinder 43 is fitted in a central hole of a cylinder supporting ring 62 fixed within the cylindrical casing 60. Unlike the left and right direction fine control mechanism, there are no outside slider and inside slider connected to base plates. All other parts, however, are constructed like the left and right direction mechanism 38.

One end of a communication hose 63 is connected to the hose fitting part 43*b* of the hydraulic cylinder 43. The other end of the connection hose is connected to a Z coordinate hydraulic cylinder 73 of vertical fine control of the micromanipulator 2 (FIG. 8).

FIG. 8 is an exploded perspective view of the micromanipulator. As shown in FIG. 8, the micromanipulator 2 has a fixing plate 65 provided at its sides with holes 65*a*, 65*a* adopted to receive bar 4. When inserted within plate 65, bar 4 is secured to the fixing plate 65. A screw 66 secures the fixing plate 65 to bar 4. Further, the fixing plate 65 is secured to the upper end of the Z coordinate inside slider 69 by means of bolts 67 provided on the upper surface of the fixing plate 65. Said Z coordinate inside slider 69 is slidably mounted for vertical movement through a bearing (not shown) in the vertical groove 70*a* provided in the Z coordinate outside slider 70, a tension spring (not shown) is set in a small groove provided in Z coordinate direction in the inside slider 69. One end of the tension spring is fixed to the Z coordinate inside slider 69 and the other end of the tension spring is fixed to the Z coordinate outside slider 70. The tension spring always provides an upwardly directed force to the Z coordinate outside slider 70.

A piston fixing plate 69*a* is provided at one end of the groove 70*a* of the Z coordinate outside slider 70 at the lower end of the Z coordinate inside slider 69. Said piston fixing plate 69*a* is provided with a vertically oriented piston 72.

A hydraulic cylinder 73 having an opening directed towards piston 72 is fixed by means of parallel cylinder setters 74, 74 separated by a predetermined distance at the opposite side of the Z coordinate outside slider 70 from groove 70*a*. The hydraulic cylinder 73 has one end opened and has a flange part 73*a* and a hose connection aperture 73*b* adjacent closed side of the cylinder. The flange part 73*a* contacts the upper cylinder setter 74 and one end of the hose 63 is connected to the hose connection aperture 73*b*.

The piston 72 is movably fitted within the hydraulic cylinder 73, an oil chamber is formed between the hydraulic cylinder 73 and the piston 72. The size and contour of the oil chamber of said hydraulic cylinder are the same as the size and contour of the hydraulic cylinder 43 of the micromanipulator fine control apparatus 1. Thus the same amount of oil is housed within the chamber.

The front to rear direction Y coordinate outside slider 76 and the Y coordinate inside slider 77, and left to right direction X coordinate outside slider 79 and X coordinate inside slider 80 are constructed the same as the construction of the Z coordinate outside slider 70 and the Z coordinate inside slider 69, respectively. One end of hose 58 is connected to the hose communication aperture 73*b* of the hydraulic cylinder 73 fixed to Y coordinate outside slider 76. An end of hose 55 is connected to a hose connection aperture 73*b* of the hydraulic cylinder 73 of the X coordinate outside slider 79.

The Y coordinate inside slider 77 is fixed to the Z coordinate outside slider 70. The X coordinate inside slider 80 is fixed to the Y coordinate outside slider 76.

A fitting plate 82 is fixed by means of bolts 83, 83, 83, 83 to the lower surface of the X coordinate outside slider 79. V shape grooves 82*a*, 82*a* facing downward and crossing each other are provided on the lower surface of said fitting plate 82. The tightening element 5 (FIG. 1) is inserted at its base part into the groove 82*a*. The tightening element 5 is fixed to the fitting plate 82 by means of a spring 84, an L-shaped set plate 85 and a tightening bolt 86.

Figure 9:
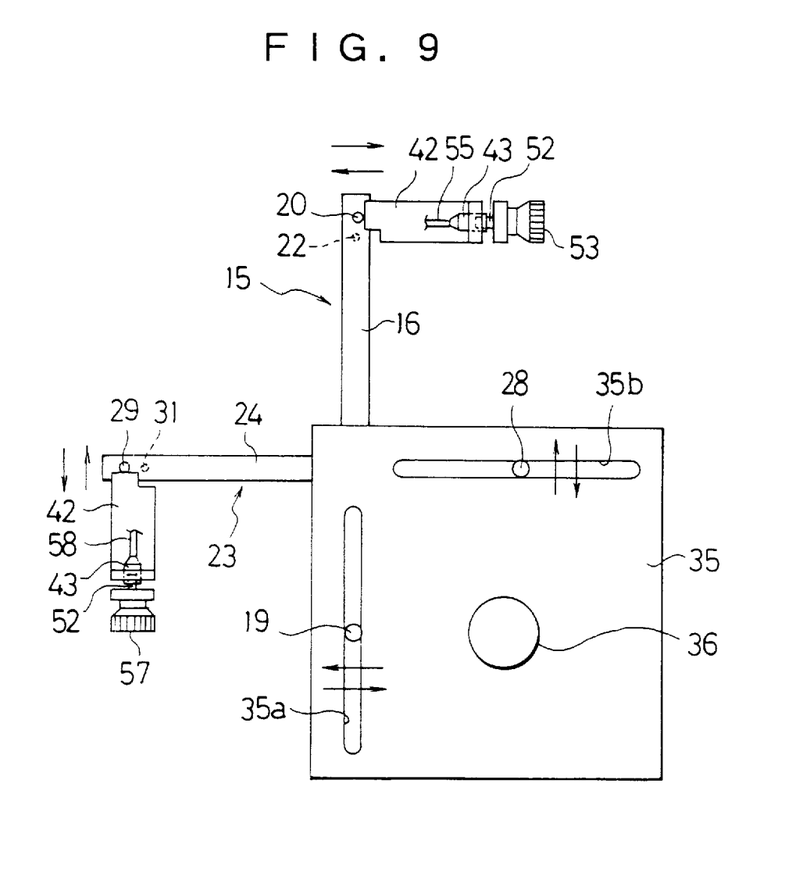
FIG. 9 illustrates the overall construction of the micromanipulator fine control according to the present invention.

Next, the operation of the micromanipulator fine control apparatus is explained with respect to FIG. 9.

At first, an operator moves the operating bar 36 forward. The slide plate 35 is moved forward and accordingly the main lever 24 is moved forwardly pivoting about the supporting pin 31 by means of the guide pin 28 engaging with the slot 35*b*. The working rod 29 is slightly rotated rearward by the action of the lever 24, and accordingly outside slider 42 and the hydraulic cylinder 43 are also slightly retracted, and the oil chamber formed between the hydraulic cylinder 43 and the piston 52 is expanded. The oil chamber formed between the Y coordinate hydraulic cylinder 73 and the piston 72 is compressed by means of the tension spring provided between the Y coordinate hydraulic cylinder 73 and the piston 72, and oil flows into the hydraulic cylinder 43 through the hose 58 from the Y coordinate hydraulic cylinder 73.

The oil chamber between the Y coordinate hydraulic cylinder 73 and the piston 72 is reduced, the Y coordinate outside slider 76 is moved forward slightly and the fitting plate 82 is also slightly moved forward.

When operator moves the operation bar 36 backward, the slide plate 35 moves backward and accordingly the main lever 24 rotates in the opposite sense about the supporting pin 31 by means of guide pin 28 engaging the slot 35b. The working rod 29 rotates forward slightly and the outside slider 42 and the hydraulic cylinder 43 also slightly move forward whereby the oil chamber formed between the hydraulic cylinder 43 and the piston 52 is reduced. Since the oil chamber is compressed, oil flows into the hydraulic cylinder 73 through the hose 58 from the hydraulic cylinder 43. The oil chamber between the Y coordinate hydraulic cylinder 73 and the piston 72 is expanded. Therefore, the Y coordinate outside slider 76 moves backward slightly and the fitting plate 82 also slightly moves backward.

When the operator moves the operation bar 36 in the right direction, the slide plate 35 moves rightward and accordingly the main lever 16 moves rightward pivoting about the supporting pin 22 by means of the guide pin 19 engaging the slot 35a, and further the working rod 20 slightly rotates leftward by the action of the lever. Accordingly, the outside slider 42 and the hydraulic cylinder 43 slightly retracts, and the oil chamber formed between the hydraulic cylinder 43 and the piston 52 is expanded. The oil chamber between the X coordinate hydraulic cylinder 73 and the piston 72 is compressed by the tension spring provided between the X coordinate outside slider 79 and the X coordinate inside slider 80 of the micromanipulator 2 whereby oil immediately flows into the hydraulic cylinder 73 through the hose 55 from the X coordinate hydraulic cylinder 73.

The oil chamber between the X coordinate hydraulic cylinder 73 and the piston 72 is reduced. The X coordinate outside slider 79 moves rightward slightly and the fitting plate 82 also slightly moves rightward.

When the operator moves the operation bar 36 leftward, the slide plate 35 moves leftward and accordingly the main lever 16 rotates leftward about the supporting pin 22 by means of the guide pin 19 engaging the slot 35a. The working rod 20 moves rightward slightly due to movement of the lever. The outside slider 42 and the hydraulic cylinder 43 also slightly move. The oil chamber formed between the hydraulic cylinder 43 and the piston 52 is reduced and oil immediately flows into the hydraulic cylinder 73 through the hose 55 from the hydraulic cylinder 43.

The oil chamber between the X coordinate hydraulic cylinder 73 and the piston 72 is expanded, the X coordinate outside slider 79 moves leftward and the fitting plate 82 also slightly moves leftward.

By the foregoing manipulations, the operator moves the slide plate 35 forward or backward and leftward or rightward by operation of the bar 36. Accordingly, the tip end of the glass electrode 7 held by the micromanipulator 2 (FIG. 1) is also fine controlled forward or backward and leftward or rightward. The operator can finely move the tip end of the glass electrode 7 in the desired direction.

As shown in FIG. 6, if the operator rotates the front and rear direction handle 57, the fine control screw shaft 50 rotates and the fine control screw shaft 50 and the piston 52 move forward and backward in the hydraulic cylinder 43. Accordingly, the amount of oil in the oil chamber of the hydraulic cylinder 43 is increased or decreased. Also the oil amount in the oil chamber in the Y coordinate hydraulic cylinder 73 of the micromanipulator 2 is increased or decreased. The Y coordinate outside slider 76 is slightly moved forward or backward.

When the operator rotates the left and right fine control handle 53 the fine control screw shaft 50 is also rotated. The fine control screw shaft 50 and the piston 52 move in left and right directions in the hydraulic cylinder 43 and accordingly the amount of oil in the oil chamber of the hydraulic cylinder 43 is increased or decreased. The oil amount in the oil chamber in the X coordinate hydraulic cylinder 73 of the micromanipulator 2 connected through the hose 55 from the hydraulic cylinder 43 also is increased or decreased. The X coordinate outside slider 79 slightly moves leftward or rightward.

As shown in FIG. 7, when the operator rotates the vertical handle 61 the fine control screw shaft 50 rotates and the fine control screw shaft 50 and the piston 52 move upward and downward in the hydraulic cylinder 43. Accordingly, the amount of oil in the oil chamber of the hydraulic cylinder 43 is increased or decreased. Thus, the oil amount in the oil chamber of the Z coordinate hydraulic cylinder 73 of the micromanipulator connected through the hose 63 from the hydraulic cylinder 43 also is increased or decreased. The Z coordinate outside slider 70 slightly moves upward or downward.

In the above described embodiment the grooves 9 and 10 of the base plate are located extends in parallel from left to right with a predetermined distance in the front to rear direction. However, the invention is not limited to this embodiment. The parallel grooves 9 and 10 can extend in a front to rear direction spaced by a predetermined distance from left to right.

Further, in the above described embodiment hydraulic cylinders are used for the micromanipulator fine control apparatus. However, water pressure cylinders can be employed.

In the above described embodiment, one hydraulic cylinder of the micromanipulator fine control apparatus and one hydraulic cylinder of the micromanipulator are used. It is of course allowed to use multiple hydraulic cylinders.

In addition, the hydraulic cylinder 43 is associated with the outside slider 42 and the piston 52 is associated with the base plate 8 in the aforementioned embodiment. Alternatively, piston 52 can be associated with provided to the outside slider 42 and the hydraulic cylinder 43 can be associated with the base plate 8.

In addition, the vertical fine control operation mechanism is provided to the operation handle 36 on the slide plate 35 but it is not limited to this. The vertical fine control operation mechanism can be provided independently from the operation bar at a free position on the slide plate. Additionally, it is of course possible to provide the vertical fine control mechanism not on the slide plate but on the base plate.

In addition, the slots 35a and 35b are provided on the slide plate 35 in the above-described embodiment but it is possible to place only slots if the guide pins 19 and 28 are engageable and movable within the respective slots.

As explained in above, the operator holds the operation lever vertically provided on the slide plate and moves the slide plate forward or backward or leftward or rightward. The micromanipulator and the tip end of the microtool held by the micromanipulator are moved in the same direction as the slide plate in forward and backward direction or leftward and rightward direction. The micromanipulator and the tip end of the microtool are finely controlled. Operation becomes quite easy and operation effect is greatly improved by the present invention.

It is also possible to provide fine control as the fine control lever is applied according to the present invention. The operability is thus greatly improved.

What is claimed is:

1. A microcomanipulator fine control apparatus, comprising:

a base plate provided with a pair of parallel grooves separated by a predetermined distance, said grooves extending in a left to right direction within the base plate;

a slide frame provided with a pair of parallel slide members dimensioned and spaced so as to be slidably received within respective grooves in the base plate, said slide frame further including a pair of parallel guide parts extending between the slide members and arranged at right angles thereto so as to extend in a forward to backward direction with respect to the base plate;

a slide plate supported by the slide members and retained between the guide parts for sliding movement in either the forward or backward direction, said slide plate supporting an upright operation handle and having a first slot along one side thereof extending in the left to right direction and a second slot along another side thereof extending in the forward to backward direction;

a first lever received within a first recessed portion of said base plate, said first lever being pivotally connected adjacent one of its ends to the base plate and extending substantially in the left to right direction within said first recessed portion, said first lever at its opposite end supporting a first vertically extending guide pin and being provided with a first notched portion intermediate its ends, said first guide pin being received in one of said slots in the slide plate;

a first movable member slidably positioned within a first longitudinally extending groove provided in said one end of the first lever and supporting a first upwardly projecting working rod;

a first fine control adjustment screw extending between said one end of the first lever and said first movable member for adjusting the position of the first movable member within said first longitudinally extending groove thereby adjusting the distance between the first working rod and the pivotal connection of the first lever to the base plate;

a first slider slidably connected to the base plate and arranged in contacting relationships with the first working rod, said first slider being slidably movable in the forward to backward direction on said base plate;

a first fine control hydraulic pressure device operatively related to said first slider, said first fine control device including a first hydraulic cylinder connected at one end to a forward to backward direction fine control hydraulic cylinder of the micromanipulator through a first hose, and a first piston movably positioned within the first hydraulic cylinder, said first fine control device being responsive to movement of the first slider to increase or decrease the amount of fluid within the first hydraulic cylinder;

a second lever received within a second recessed portion of said base plate, said second lever being pivotally connected adjacent one of its rods to the base plate and extending substantially in the forward to backward direction within said second recessed portion, said second lever at its opposite end supporting a second vertically extending guide pin and being provided with a second notched portion intermediate its ends which crosses the first notched position of said first lever, said second guide pin being received in the other of said slots in the slide plate;

a second movable member slidably positioned within a second longitudinally extending groove provided in said one end of the second lever and supporting a second upwardly projecting working rod;

a second fine control adjustment screw extending between said one end of the second lever and second movable member for adjusting the position of the second movable member within said second longitudinally extending groove thereby adjusting the distance between the second working rod and the pivotal connection of the second lever to the base plate;

a second slider slidably connected to the base plate and arranged in contacting relationship with the second working rod, said second slider being slidably movable in the left to right direction on said base plate; and a second fine control hydraulic pressure device operatively related to said second slider, said second fine control device including a second hydraulic cylinder connected at one end to a left to right direction fine control hydraulic cylinder of the micromanipulator through a second hose, and a second piston removably positioned within the second hydraulic cylinder, said second fine control device being responsive to movement of the second slider to increase or decrease the amount of fluid within the second hydraulic cylinder; and wherein slide plate is responsive to movement of the operation handle in the forward or backward direction to pivot said first lever to displace the first working rod thereby displacing the first slider and altering the amount of fluid within the first hydraulic cylinder so as to operate the forward to backward direction fine control hydraulic cylinder of the micromanipulator, and wherein said slide plate and slide frame are responsive to movement of the operation handle in the left or right direction to pivot said second lever to displace the second working rod thereby displacing the second slider and altering the amount of fluid within the second hydraulic cylinder so as to operate the left to right direction fine control hydraulic cylinder of the micromanipulator.

2. A micromanipulator fine control apparatus according to claim 1, further comprising:

a third fine control hydraulic pressure device which is operatively related to said operation handle, said third fine control device including a third hydraulic cylinder connected at one end to a vertical direction fine control hydraulic cylinder of the micromanipulator through a third hose, and a third piston movably positioned within the third hydraulic cylinder, said third piston being operatively related to the operation handle whereby when said operation handle is selectively rotated in one direction or the other, the piston moves relative to the third hydraulic cylinder to increase or decrease the amount of fluid within the third cylinder so as to operate the vertical direction fine control hydraulic cylinder of the micromanipulator.

3. A micromanipulator fine control apparatus according to claim 2, wherein said third piston is connected to said operation handle by a fine control screw whereby when the operation handle is rotated, the third piston is moved within the third hydraulic cylinder.

4. A micromanipulator fine control apparatus according to claim 1, further comprising:

a third fine control hydraulic pressure device which is operatively related to said operation handle, said third fine control device including a third hydraulic cylinder connected at one end to a vertical direction fine control hydraulic cylinder of the micromanipulator through a third hose, and a third piston movably positioned within the third hydraulic cylinder, said third piston being connected to the operation handle by a fine control screw whereby when the operation handle is selectively rotated in one direction or the other, the third piston is moved within the third hydraulic cylinder to increase or decrease the amount of fluid within the third cylinder so as to operate the vertical direction fine control hydraulic cylinder of the micromanipulator.

5. A micromanipulator fine control apparatus according to claim 1, wherein said first and second pistons are respectively connected to first and second fine control screws, said first fine control screw being joined to a rotatable forward to backward direction fine control handle which is selectively operable to move the first piston within the first hydraulic cylinder, and said second fine control screw being joined to a rotatable left to right direction fine control handle which is selectively operable to move the second piston within the second hydraulic cylinder.

* * * * *